US012235995B2

(12) United States Patent
Hadar et al.

(10) Patent No.: US 12,235,995 B2
(45) Date of Patent: Feb. 25, 2025

(54) SYSTEM ARCHITECTURE FOR DESIGNING AND MONITORING PRIVACY-AWARE SERVICES

(71) Applicant: Accenture Global Solutions Limited, Dublin (IE)

(72) Inventors: Eitan Hadar, Nesher (IL); Dan Klein, Rosh Ha'ayin (IL); Benny Rochwerger, Tel Aviv (IL)

(73) Assignee: Accenture Global Solutions Limited, Dublin (IE)

( * ) Notice: Subject to any disclaimer, the term of this patent is extended or adjusted under 35 U.S.C. 154(b) by 475 days.

(21) Appl. No.: 17/459,464

(22) Filed: Aug. 27, 2021

(65) Prior Publication Data

US 2022/0067204 A1 Mar. 3, 2022

Related U.S. Application Data

(60) Provisional application No. 63/071,286, filed on Aug. 27, 2020.

(51) Int. Cl.
*G06F 21/62* (2013.01)
*G06F 21/57* (2013.01)
*G06N 5/02* (2023.01)
*G06N 20/00* (2019.01)

(52) U.S. Cl.
CPC ........ *G06F 21/6254* (2013.01); *G06F 21/577* (2013.01); *G06N 5/02* (2013.01); *G06N 20/00* (2019.01); *G06F 2221/034* (2013.01)

(58) Field of Classification Search
CPC .............. G06F 21/577; G06F 21/6254; G06F 2221/034; G06N 20/00; G06N 5/02

USPC .......................................................... 726/26
See application file for complete search history.

(56) References Cited

U.S. PATENT DOCUMENTS

| 11,521,746 | B1* | 12/2022 | Weintraub | G16H 50/30 |
| 2004/0098285 | A1* | 5/2004 | Breslin | G06Q 10/10 |
| | | | | 713/193 |
| 2005/0193093 | A1* | 9/2005 | Mathew | H04L 67/02 |
| | | | | 709/219 |
| 2006/0184995 | A1* | 8/2006 | Backes | G06Q 10/063 |
| | | | | 726/1 |
| 2014/0173684 | A1* | 6/2014 | McQuay | G06F 21/121 |
| | | | | 726/1 |

(Continued)

*Primary Examiner* — David P Zarka

(57) ABSTRACT

The present disclosure provides a system architecture for designing and monitoring privacy-aware services and improving privacy regulation compliance. A privacy-preserving knowledge graph (PPKG) system provides functionality for modelling and analyzing processes that use, share, or request sensitive data from users and the outcomes of such functionality may be utilized to modify the design of the processes (e.g., to improve security of the process, regulatory compliance of the process, and the like). The PPKG system may also be used to modify the process, such as to write code that may be compiled into executable form and deployed to a run-time environment. A privacy-preserving posture (PPP) system monitors the run-time environment and analyzes where processes obtain, store, and share sensitive data. The PPP system may identify run-time vulnerabilities that may pose risks with respect to the sensitive data, as well as areas where modifications could be made to improve regulatory compliance.

17 Claims, 5 Drawing Sheets

(56) References Cited

U.S. PATENT DOCUMENTS

| | | | |
|---|---|---|---|
| 2014/0282837 A1* | 9/2014 | Heise | H04L 63/102 |
| | | | 726/1 |
| 2014/0365436 A1* | 12/2014 | Calienes | H04L 67/1095 |
| | | | 707/620 |
| 2017/0286690 A1* | 10/2017 | Chari | G06F 21/577 |
| 2019/0121979 A1* | 4/2019 | Chari | G06F 8/433 |
| 2020/0065112 A1* | 2/2020 | Gotze | G06F 9/3844 |
| 2020/0285771 A1* | 9/2020 | Dey | G06F 21/6272 |
| 2021/0006642 A1* | 1/2021 | He | H04L 43/16 |
| 2023/0214511 A1* | 7/2023 | Golan | G06F 21/6218 |
| | | | 726/1 |

* cited by examiner

SYSTEM ARCHITECTURE FOR DESIGNING AND MONITORING PRIVACY-AWARE SERVICES

CROSS-REFERENCE TO RELATED APPLICATION

The present application claims the benefit of U.S. Provisional Application No. 63/071,286 filed Aug. 27, 2020 and entitled "SYSTEM ARCHITECTURE FOR PROVIDING PRIVACY BY DESIGN," the disclosure of which is incorporated by reference herein in its entirety.

TECHNICAL FIELD

The present application relates to network system architectures and more specifically to techniques for providing a network system architecture that provides design-phase and run-time monitoring and modification of application processes that consume sensitive data based on privacy regulatory requirements.

BACKGROUND

As technology has advanced, both in terms of processing and/or computing capabilities, as well as in terms of portability, technology has become an increasingly integral part of people's daily lives. For example, use of services (e.g., online shopping, banking, media streaming, etc.) are accessible via the Internet from a variety of electronic devices, such as smartphones, tablet computing devices, personal computing devices (e.g., desktop computing devices, laptop computing devices, etc.), smart speakers (e.g., the Amazon Echo or the Google Assistant), or numerous other types of devices. As users interact with these services they provide personal data (e.g., financial card data, bank account data, name, address, etc.) that may be recorded, stored, and shared with other entities. For example, a user may provide financial card information and other data to a desired service provider (e.g., an e-commerce website providing online shopping functionality) and the service provider may then share all or portions of that information with another service provider, such as sharing financial card data with a financial services provider to obtain an authorization of the financial card or for other purposes.

This proliferation of technology and the services has provided many new and useful tools that enrich our lives in many ways. However, there are some drawbacks that are realized as a result of the requirements for accessing such services and functionality, such as the need to share sensitive information (e.g., financial card information, address information, and the like). The sensitive information shared with different entities is stored, creating an ever increasing number of potential targets for malicious actors seeking to gain access to the sensitive information for improper purposes. The actions of these malicious actors are often manifested as data breaches where the actors improperly gain access to sensitive information stored on a service provider's system.

In recent years highly publicized data breaches have led legislators around the globe to look for ways to protect people's privacy. The resulting legislation, most notably the General Data Protection Regulation (GDPR) in Europe, and the California Consumer Privacy Act (CCPA) in the US, regulate the collecting, processing and storage of personal data. Such legislation has led to modern systems being required to have functionality for enforcing security and privacy requirements embedded in the system functionality from the early stages of design and that functionality must evolve throughout the lifecycle of the service and/or product. Despite efforts to improve security of the systems, services, and products that collect sensitive data from users, cyber threats generated by external actors are constantly evolving, seeking to exploit existing and newly discovered vulnerabilities. To combat such threats, privacy compliance systems must also evolve, often rapidly, in order to pre-empt and mitigate threats before they can be exploited by malicious actors. In addition to evolving threats, regulations, governing personal and sensitive data also evolve, creating additional challenges that must be addressed by those responsible for designing and maintaining the systems that collect, store, use, and/or share sensitive user information.

An additional consideration is that transactions involving personal data increasingly involve connecting people, things (e.g., Internet of Things (IoT) devices, sensors, etc.), and systems across a supply chain. In these types of situations, data—and in particular private data—is moved between different virtual and geographical locations, modified, analyzed (e.g., by artificial intelligence (AI) or other analytics processes), or subjected to other processing to provide or enable proactive decisions to be made and/or actions performed for the benefit of one or more involved parties (e.g., businesses, service providers, and users providing data, and the like). These types of transactions often consist of connected and orchestrated internal or external services, which may be provided by different legal entities or across organizational boundaries. Online and remote service providers need to maintain cyber and privacy responsibilities with regard to their consumed private data (e.g., personal or sensitive data provided to a specific entity by a user or another entity). As such, security and privacy concerns are not isolated to any single enterprise or business process—rather, these concerns are propagated via a supply or service chain that collects and shares data. Thus, it is important that the involved systems include capabilities to pre-empt a cyber or privacy issue from manifesting within the transaction ecosystem.

The above-described considerations have created demanding conditions that service providers or other entities must consider when designing and operating systems that receive and utilize personal or sensitive data that is subject to various privacy regulations. Such considerations may include: (1) How can users have transparency over, and control of, how various processes/entities/services access, use, and share the user's private information and risks related to those processes/entities/services; (2) How can entities guarantee privacy law compliance in an easy and frictionless manner, while constantly improving the service quality across the supply chain; and (3) How can developers and analysts create privacy compliant solutions in a quick and simple manner without prior knowledge in privacy or security? Presently, these issues present a significant challenge with respect to using, designing, and operating systems that provide services, processes, or other types of functionality that utilize data subject to various types of privacy regulations.

SUMMARY

The present application discloses systems, methods, and computer-readable storage media that provide a system architecture for designing and monitoring privacy-aware services and improving privacy regulation compliance. The disclosed system architectures include a design component, referred to as a privacy-preserving knowledge graph (PPKG) system and a run-time component, referred to as a privacy-preserving posture (PPP) system. The PPKG system may include functionality for modelling and analyzing processes that use, share, or request sensitive data from users. For example, the PPKG may model and analyze enterprise system processes that interact with users to conduct transactions. As the user interacts with the process(es), sensitive data may be solicited from the user, which may or may not trigger privacy regulation requirements. Moreover, those processes may also seek to share the sensitive data shared by the users with other processes, such as services of supply chain systems. This sharing of data may also be subject to regulatory requirements with respect to handling of sensitive user data.

The PPKG system's modelling and analysis capabilities may model how sensitive data is obtained by the business processes of the enterprise system, the location where that sensitive data is stored, how access to the sensitive data stored in that location is controlled, how the process shares data, or other factors. The modelling and analysis process may be configured to produce recommendations to modify the process to improve regulatory compliance, such as to anonymize, obfuscate, or otherwise make shared sensitive data more abstract (e.g., converting a user's exact age to an age range, such as over 21 years of age, over 30 years of age, adult, under 21 years of age, child, etc.). The modelling and analysis may also determine whether the same pieces of sensitive data are being stored in numerous locations (e.g., as a result of different processes collecting the same or similar sensitive data) and may make recommendations to update consents by users if it is discovered that sensitive data with a specific consent for one process conflicts with another consent given for the same data in a second process (e.g., because the existence of different consents for the same data may result in the data being shared out of context). The PPKG system may also provide an interactive development environment (IDE) that may be used to modify the software implementation of the various processes considered by the modelling and analysis processes described above. The modifications to the process may involve generating software, which may be written in a programming language and then compiled into executable code, that may then be deployed to a run-time environment so that the implemented modifications to processes can be realized in practice.

The PPP system may be configured to monitor the run-time environments where the processes that are modified by the PPKG studio are run. For example, an enterprise system (e.g., an e-commerce service provider system, a healthcare service provider system, etc.) may provide various processes that were designed using the PPKG system. As those processes are designed and deployed to the run-time environment, the PPP system may then monitor the "online" or "active" processes of the enterprise system. As part of the monitoring, the PPP system may maintain a plurality of knowledge graphs that may indicate where processes obtain sensitive data, where those processes store the sensitive data, which of the processes collect/use/share sensitive data, what portions of the collected sensitive data are shared, or other types of information associated with how sensitive data flows to, within, and from the processes of the enterprise system. Similar to the PPKG system, the PPP system may analyze the knowledge graphs and processes for regulatory compliance and risks with respect to the sensitive data, and based on the analysis by the PPP system, modifications determined to improve regulatory compliance or mitigate risk of non-compliance may be output. The risk of non-compliance may be determined, at least in part, based on testing of attack paths associated with known potential sensitive data targets (e.g., vulnerability testing of known locations storing sensitive data, etc.) and recommendations based on the testing may also be output to improve the security of the sensitive data.

In some aspects, the disclosed systems and techniques may enable hyper-personalization of processes based on consents provided by a specific user. For example, hyper-personalization settings configured by a user may be used to customize how processes are executed (e.g., the types of data used as inputs, the source of the inputs, the processing flows, etc.), such as to authorize a bank and/or financial service provider (e.g., credit card provider) to automatically manipulate and execute funds transfers to maintain available credit levels and balances in a sufficient state so that payment processes can proceed without interruption when initiated by the consenting user. As another example, a payment process of an enterprise system may communicate with banks and/or financial card service providers in advance of a user selecting a payment option in order to suggest a new default payment option to use based on real-time account balance and/or credit limits, or even automatic changing of default payment options (e.g., if appropriate consent has been provided by the user). It is noted that the exemplary hyper-personalization capabilities described above have been provided for purposes of illustration, rather than by way of limitation and that hyper-personalization capabilities may be utilized with respect to non-financial systems and processes in accordance with the present disclosure.

In addition to the design and run-time aspects described above, aspects of the present disclosure may also provide tools that provide improved transparency to users with respect to their shared sensitive data. For example, an application may be installed on a user's user device and the application may track what sensitive data the user has shared with third parties, including specific processes provided by those third party systems and types of data shared with each specific process. Such data may allow the user to visualize the data they have shared with third parties (e.g., vendors, service providers, etc.) and may also provide the user with functionality to withdraw (completely or partially) consent to use the user's sensitive data. The ability to provide and withdraw consent to use, access, and/or share sensitive data of a user (e.g., for specific processes, systems, etc.) enables the user to provide sensitive data at one point in time, such as when a purchase is made using a sales process, and then prevent the sales process from subsequently accessing or sharing that sensitive data (e.g., by withdrawing consent with respect to the sensitive data for the sales process once the sale is complete).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

Figure 1:
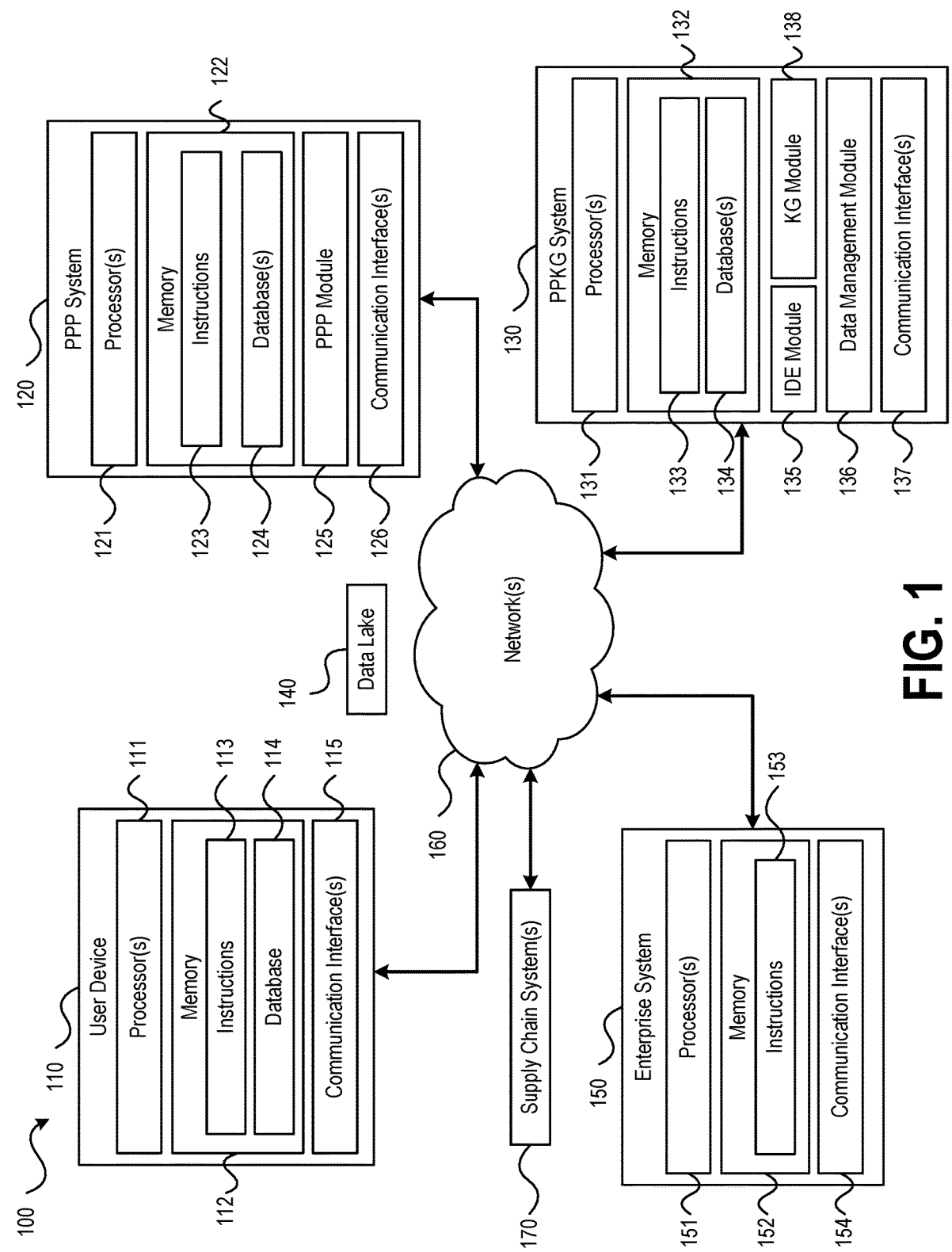
FIG. 1 is block diagram illustrating aspects of a system architecture in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of the present disclosure provide a system architecture that enables rapid development and deployment of applications that are compliant with applicable privacy regulations. The system architecture includes a PPKG system, which is a design-phase component that maintains a privacy preserving knowledge graph and provides development tools. The PPKG system may leverage the privacy preserving knowledge graph to analyze application processes based privacy requirements and the tools provided by the PPKG system may be used to modify the application process based on compliance issues identified based on the analysis of the processes using the privacy preserving knowledge graph. For example, the development tools may enable software code to be modified (e.g., based on suggestions determined by the analysis functionality of the PPKG system) to achieve compliance with applicable regulatory requirements. Once modified, the software code may be compiled into executable code that may then be deployed to a run-time environment to ensure that the run-time instance of that (modified) process complies with applicable regulatory requirements. The system architecture also includes a PPP system, which is a run-time component that may analyze run-time processes to identify instances where regulatory compliance issues may arise. For example, the PPP system may monitor a run-time instance of a deployed process to identify entry and exit points where sensitive data is received by, stored by, and/or shared by the process. The PPP system may also evaluate whether any of those entry and exit points result in improper access and/or sharing of sensitive data. Additionally, the PPP system may perform penetration testing to evaluate potential security vulnerabilities with respect to stored sensitive data, such as to identify vulnerabilities that may allow malicious actors to gain access to sensitive data or instances where sensitive data is accessible without appropriate user consent. The run-time monitoring functionality provided by the PPP system may also determine recommendations to modify the monitored processes to bring those processes in compliance with applicable regulatory requirements and/or prevent unauthorized access or use of sensitive data (e.g., improve data security). The functionality provided by the PPKG and PPP systems may enable privacy-by-design and security-by-design capabilities to be fully realized, which enables privacy regulation compliant software processes to be designed and deployed more quickly, including when changes to the privacy regulations occur. Additionally, the PPKG and PPP systems may improve the overall security of data and mitigate the likelihood that sensitive data used by, stored by, or shared by or with the monitored systems is used for improper purposes (e.g., identity theft, etc.), thereby improving the overall security of sensitive data within run-time environments.

Referring to FIG. 1, a block diagram of a system architecture that enables rapid design and deployment of privacy regulation compliant processes in accordance with aspects of the present disclosure is shown as system 100. As shown in FIG. 1, the system architecture includes a privacy posture preserving (PPP) system 120 and a privacy preserving knowledge graph (PPKG) system 130. The PPP system 120 and the PPKG system 130 may be in communication with one or more external systems or devices, such as one or more user devices 110, a data lake 140, one or more enterprise systems 150, other systems (e.g., supply chain systems, regulatory authority systems, etc.), or a combination of different ones of these systems and devices, via one or more networks 160. As described in more detail below, the PPP system 120 and the PPKG system 130 may be configured to provide privacy-by-design functionality and security-by-design functionality to various external systems and devices, such as the user device(s) 110, data lake 140, the enterprise system(s) 150, and supply chain systems 170. For example, the PPKG system 130 may provide functionality for creating ontological content at design time and implementing rules for privacy-by-design (e.g., with respect to the enterprise system(s) 150, supply chain system(s) 170, or both) and the PPP system 120 may provide functionality for preserving the privacy of user data with respect to the enterprise system(s) 150, supply chain system(s) 170, or both.

The one or more networks 160 facilitating communications between different systems and devices of the system architecture shown in FIG. 1 may include local area networks (LANs), wide area networks (WANs), wireless LANs (WLANs), wireless WANs, metropolitan area networks (MANs), cellular data networks, cellular voice networks, the Internet, and the like. The communication links provided via the one or more networks 160 may include wired or wireless communication links established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ Generation (3G) communication standard, a $4^{th}$ Generation (4G)/long term evolution (LTE) communication standard, a $5^{th}$ Generation (5G) communication standard, and the like).

As shown in FIG. 1, the one or more user devices 110 may include one or more processors 111, a memory 112, and one or more communication interfaces 115. In an aspect, the one or more user devices 110 may include smartphones, laptop computing devices, desktop computing devices, tablet computing devices, wearable devices (e.g., smart watches, heart rate or other biometric data collection devices, etc.), and the like. The one or more processors 111 may include central processing units (CPUs) and/or graphics processing units (GPUs) having one or more processing cores or other computing circuitry (e.g., a microcontroller, one or more application specific integrated circuits (ASICs), field programmable gate arrays (FPGAs), and the like). The memory 112 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 112 may store instructions 113 that, when executed by the one or more processors 111, cause the one or more processors 111 to perform the operations described in connection with the user device(s) 110. The memory 112 may also store information and data in one or more database 114. Exemplary aspects of the types of information and data that may be stored in the one or more databases 114 are described in more detail below. The one or more communication interfaces 115 may be configured to communicatively couple the user device(s) 110 to the one or more networks 160 via wired or wireless communication links according to one or more communication protocols or standards (e.g., the one or more communication standards described above with reference to the one or more networks 160).

The PPP system 120 may include one or more processors 121, a memory 122, a PPP module 125, and one or more communication interfaces 126. The one or more processors 121 may include CPUs and/or GPUs having one or more processing cores or other computing circuitry (e.g., a microcontroller, one or more ASICs, FPGAs, and the like). The memory 122 may include ROM devices, RAM devices, one or more HDDs, flash memory devices, SSDs, other devices configured to store data in a persistent or non-persistent state, or a combination of different memory devices. The memory 122 may store instructions 123 that, when executed by the one or more processors 121, cause the one or more processors 121 to perform the operations described in connection with the PPP system 120. The memory 122 may also store information and data in one or more database, such a PPP database 124. Exemplary aspects of the types of information and data that may be stored in the PPP database 124 are described in more detail below. The one or more communication interfaces 126 may be configured to communicatively couple the PPP system 120 to the one or more networks 160 via wired or wireless communication links according to one or more communication protocols or standards (e.g., the one or more communication standards described above with reference to the one or more networks 160). Although not shown in FIG. 1, the PPP system 120 may also include one or more I/O devices, such as one or more display devices, a keyboard, a stylus, one or more touchscreens, a mouse, a trackpad, a camera, one or more speakers, haptic feedback devices, or other types of devices that enable a user (e.g., an information technology (IT) administrator, an engineer/programmer, or other person) to interact with functionality provided by the PPP system 120.

The PPP module 125 may be configured to provide runtime-based functionality for controlling or monitoring how sensitive data (e.g., data subject to privacy regulations) flows between users, the enterprise system(s) 150, and the supply chain systems 170 (e.g., third party systems that support operations of the enterprise systems, such as financial card authorization service providers that authorize financial transactions between a user and an enterprise system). In some aspects, the PPP module 125 may be configured to leverage artificial intelligence processes (e.g., trained machine learning, graph neural network, or conventional and discrete graph algorithms) to support interactions between various systems and devices (e.g., user device(s) 110, enterprise system(s) 150, and the supply chain systems. Exemplary aspects of the PPP module 125 and the PPP system 120 are described in more detail below.

The PPKG system 130 may include one or more processors 131, a memory 132, an interactive development environment (IDE) module 135, a data management module 136, one or more communication interfaces 137, and a KG module 138. The one or more processors 131 may include CPUs and/or GPUs having one or more processing cores or other computing circuitry (e.g., a microcontroller, one or more ASICs, FPGAs, and the like). The memory 132 may include ROM devices, RAM devices, one or more HDDs, flash memory devices, SSDs, other devices configured to store data in a persistent or non-persistent state, or a combination of different memory devices. The memory 132 may store instructions 133 that, when executed by the one or more processors 131, cause the one or more processors 131 to perform the operations described in connection with the PPKG system 130. The memory 132 may also store one or more databases 134. As described in more detail below, the one or more databases 134 may be configured to store data (e.g., as ontologies, KGs, design data, analytics process data, or other types of data) configured to support the operations of the PPKG system 130. The one or more communication interfaces 137 may be configured to communicatively couple the PPKG system 130 to the one or more networks 160 via wired or wireless communication links according to one or more communication protocols or standards (e.g., the one or more communication standards described above with reference to the one or more networks 160). Although not shown in FIG. 1, the PPKG system 130 may also include one or more I/O devices, such as one or more display devices, a keyboard, a stylus, one or more touchscreens, a mouse, a trackpad, a camera, one or more speakers, haptic feedback devices, or other types of devices that enable a user (e.g., an information technology (IT) administrator, an engineer, a programmer, or other person) to interact with functionality provided by the PPKG system 130.

The IDE module 135 may be configured to model and analyze processes of the enterprise system(s) 150. The modelling and analysis of the processes may be assisted by data-in-motion rules that analyze how data flows through the processes, where sensitive data is obtained or used, and identify any portions of the process where potential regulatory violations may occur. In aspects, test data may be utilized to perform at least a portion of the analysis of how data flows through the processes (e.g., to avoid violating privacy regulations if the process is not compliant with regulatory requirements). If a process is identified as not compliant with applicable regulatory requirements, an alert may be generated to notify appropriate persons of the identified process so that it may be corrected to conform to the applicable regulatory requirements. In some aspects, the notification may include information that identifies a specific part of the process (e.g., a routine, sub-routine, function, etc.) where the non-compliance was detected.

The data management module 136 may be configured to generate synthetic or anonymized data that may be used for testing and training (e.g., training of the AI processes utilized by the PPKG system 130) purposes. Additionally, the data management module 136 may be configured to build and deploy content packages (e.g., executable versions of software processes) designed using the IDE module 135. The KG module 138 may be configured to maintain data (e.g., KGs, ontologies, data-in-motion rules, or other types of data) that may be utilized to perform analytics analysis or other processes (e.g., design processes based on the ontologies, create SDKs, deploy algorithms to the PPP system 120 to facilitate run-time analysis an monitoring, and the like). Additional details regarding the IDE module 135, the data management module 136, and the KG module 138 of the PPKG system 130 are described in more detail below.

The data lake 140 may maintain one or more databases configured to store data that may be utilized for testing purposes. For example, the PPKG system 130 may utilize data stored in the data lake 140 to test and analyze how data (e.g., personal data) flows through processes and functionality provided by a system (e.g., the enterprise system(s) 150, supply chain system(s) 170, or another system). The data stored in the data lake 140 may be anonymized data suitable for testing purposes rather than actual personal data provided by users. The data anonymization enables the PPKG system 130 to perform testing and analysis of processes, workflows, and other aspects of the functionality provided by the system(s) under test (e.g., the enterprise system(s) 150, supply chain system(s) 170, or another system), such as to identify processes, workflows, or other functionality that may result in violations of applicable privacy regulations. It is noted that the operations of the PPKG system 130 may be configured to perform analysis of, and identify portions of the processes, workflows, or other functionality that potentially violate privacy requirements without running the risk of actually violating those regulations (e.g., by utilizing anonymous data or anonymized data from the data lake 140). As described in more detail below, the PPKG system 130 may provide functionality for flagging and correcting any portions of the system(s) under test (e.g., the enterprise system(s) 150, supply chain system(s) 170, or another system) that are identified as potential sources of regulatory violations, enabling the functionality of the tested system(s) to be rapidly corrected to be in compliance with applicable regulatory requirements. In aspects, the data lake 140 may be maintained in a database server, a data center, or other type of data storage accessible to the PPKG system 130 via the one or more networks 160. In some aspects, the data lake 140 may be maintained local to the PPKG system 130, such as in the memory 132.

The enterprise system(s) 150 may include one or more processors 151, a memory 152, and one or more communication interfaces 154. The one or more processors 151 may include CPUs and/or GPUs having one or more processing cores or other computing circuitry (e.g., a microcontroller, one or more ASICs, FPGAs, and the like). The memory 152 may include ROM devices, RAM devices, one or more HDDs, flash memory devices, SSDs, other devices configured to store data in a persistent or non-persistent state, or a combination of different memory devices. The memory 152 may store instructions 153 that, when executed by the one or more processors 151, cause the one or more processors 151 to perform the operations described in connection with the enterprise system(s) 150. The one or more communication interfaces 154 may be configured to communicatively couple the enterprise system(s) 150 to external devices and systems (e.g., the user device 110, the PPP system 120, the PPKG system 150, the supply chain system(s) 170, etc.) via the one or more networks 160 using wired or wireless communication links according to one or more communication protocols or standards (e.g., the one or more communication standards described above with reference to the one or more networks 160). Although not shown in FIG. 1, the enterprise system(s) 150 may also include one or more I/O devices, such as one or more display devices, a keyboard, a stylus, one or more touchscreens, a mouse, a trackpad, a camera, one or more speakers, haptic feedback devices, or other types of devices that enable a user (e.g., an information technology (IT) administrator, an engineer, a programmer, or other person) to interact with functionality provided by the enterprise system(s) 150.

The supply chain systems 170 may include systems operated by third parties with respect to the user(s) associated with the user device(s) 110 and the entities operating the enterprise system(s) 150. The supply chain systems 170 may be configured to provide services and functionality that support, enhance, or otherwise facilitate the services and functionality of the enterprise system(s) 150. It is noted that while not shown in FIG. 1, the supply chain systems 170 may include processors, memory, communication interfaces, databases, and other types of components and functionality, which are not illustrated in FIG. 1 for simplicity of the disclosure.

To better understand aspects of the system architecture shown in FIG. 1, a non-limiting and exemplary use case that involves conducting a payment interaction between the user device 110 and the enterprise system 150 (e.g., to pay for one or more items during a checkout process provided by the enterprise system 150). During the payment interaction a user of the user device may access functionality of the enterprise system 150 (e.g., e-commerce functionality) to select one or more items or services for purchase. Once the items or services have been selected for purchase by the user the payment interaction process may proceed to a checkout step. The checkout step may play an important role in terms of realizing or completing the sale. For example, a checkout step that can be performed quickly and simply (from the purchaser/user perspective), such as a one-click pay option, may increase the likelihood of completing the sale, but the user may respond negatively if the checkout step is time consuming or needs to be restarted. To illustrate, if the financial information provided by the user is not approved due to limited credit levels or for other reasons and the user has to restart the checkout step again using a different payment option or method (e.g., another financial card or account), the user may become frustrated and the sale may not be completed. To simplify the checkout process and improve the user experience, the enterprise system 150 may be designed to allow the user to create different payment options that are personalized to the user's needs or preferences or that are tied to certain types of transactions (e.g., transactions satisfying one or more threshold values, transactions involving certain types of products or services, or other types of transaction preferences). Allowing the user to specify different payment options in this manner may lessen the likelihood that a checkout process needs to be restarted and at least lessen the burden on the user for instance when a restart is required.

Despite such efforts, credit limits associated with the user's financial cards and accounts may change as time elapses and as the user makes purchases elsewhere using one or more those accounts. Thus, situations may still arise where a selected (or default) payment option is not authorized and the user may need to restart the checkout process. In such situations, the user may have a positive or sufficient balance to provide the payment in other accounts and rather than providing the user with a negative experience at the checkout step (e.g., due to rejection of the initial payment method), it may be desirable to present to the user with one or more alternative methods of payments. However, determining the alternative payment method(s) that should be presented to the user may require use of additional private data (e.g., financial account or card information) known to a third party, such as a bank. Alternatively, a proactive payment service may approach the user ahead of time and recommend funds transfer or funds loan in order to balance the credit limits, or even alternatively change the payment method for the transaction between the user and the enterprise system 150 ahead of time.

In the exemplary scenario described above there are numerous instances where the user's sensitive data needs to be shared with and/or accessed by third parties, such as the enterprise system 150 or other supply chain systems (e.g., banks, etc.). Designing functionality to achieve the features described above presents a number of privacy related challenges, both with respect to obtaining and maintaining the user's sensitive data at the enterprise system 150 and potentially sharing or using the user's sensitive data during interactions between the enterprise system 150 and one or more supply chain systems 170 (e.g., payment processor systems, banking systems, etc.). To increase the likelihood of regulatory compliance, systems (e.g., the enterprise systems 150) should be designed to streamline and utilize private financial information as much as possible before the payment transaction begins. An additional design consideration for improving financial service experiences involving the enterprise systems 150 is that the user should be able to easily maintain sensitive data and trusted verification conditions for possible payment methods. Moreover, systems that utilize sensitive data (e.g., the enterprise systems 150 and the supply chain systems 170) should be designed so that sensitive data is collected from the user for a specific purposes, such as conducting a payment transaction, and that sensitive data provided by the user for that specific purpose cannot be utilized for other purposes without obtaining consent from the user. For example, the user may consent to a bank sharing sensitive data provided to the bank by the user with online retailers for the purpose of simplification of online orders and may also authorize the bank to use the sensitive data for other bank business processes, such as loans and stock exchange transactions. In such instances, the system of the bank should be designed to utilize the user's sensitive data only in instances where the user's consent is consistent with the manner in which, or the purpose for which the banking system is using that data because uses of sensitive data for purposes outside the scope of the user's consent may result in non-compliance with applicable privacy regulations.

The exemplary use case presented above also highlights several privacy related problems that may arise during interactions between users associated with user devices 110 that are used to provide sensitive data to the enterprise systems 150 and/or the supply chain systems 170. For example, suppose the user opts to remove certain sensitive data. When this occurs, which business processes must adhere to this request, and consequently, should the customer be made aware of the impact that the data removal may have on their experience, such as a reduced level of service or quality of service being provided? As another example, should consent for sensitive data usage be renegotiated with the user for a specific process (e.g., a payment process) or a set of processes (e.g., a set of payment processes), and can consent for a payment process be used for other means, such as identification? Additionally, some privacy regulations may limit sharing of specific data types between different units or departments within a single enterprise, which means that consent for one unit of the enterprise to use the user's sensitive data may not necessarily authorize other units of the enterprise to use that data. This creates situations where consent and consequently, monitoring the implementation of processes that rely on the consent, may need to be specified at the data type level, which raises questions about whether consent to holistic use of sensitive data is appropriate. Even more so, receiving a generic consent from the end-user does not ensure that the customer is aware of what derived and inferred knowledge can be deduced, and why such inferred or deduced knowledge is being obtained, which raises the question of whether all sensitive data information types can be shared equally with all business processes of the enterprise system(s) 150 and/or shared with the supply chain systems 170.

From the foregoing it should be recognized that designing systems (e.g., the enterprise systems 150 and the supply chain systems 170) that comply with regulatory requirements, both in terms of functionality internal to the enterprise systems 150 and interactions between the enterprise systems 150 and other systems and devices (e.g., the user device(s) 110 and the supply chain systems 170), is a complex task that requires many considerations to be taken into account. The complexity is further increased when taking into consideration that privacy regulations evolve over time, creating a need to not only monitor the way that information is obtained from user devices 110 and utilized by processes of the enterprise system 150 and between the enterprise system 150 and supply chain systems 170, but also the regulations themselves (e.g., because a change in the regulations may result in a need to change the way that sensitive user data is utilized by and shared between the enterprise system 150 and the supply chain systems 170).

To address the above-described design considerations, the PPKG system 130 may be configured to provide a set of tools for designing and testing services and functionality provided by the enterprise system 150 in a manner that is oriented towards achieving regulatory compliance. For example and referring to FIG. 3, a block diagram illustrating exemplary aspects of a PPKG system in accordance with aspects of the present disclosure is shown. As described above, the PPKG system 130 may include an IDE module 135. The IDE module 135 may be configured to: (1) curate different ontologies related to operations of the enterprise system(s) 150; (2) perform privacy rules harvesting and modeling; (3) maintain data-in-motion rules for data anonymization; and (4) perform privacy-aware business process modeling, which may include structuring privacy agreements subject to negotiations with a user and informing the user of the tradeoff between service value and quality of provided information. Leveraging the functionality of the IDE module 135, privacy rules may be harvested, modeled, and used as requirements within a process modeler (e.g., a process model module of the PPKG system 130), which may be utilized to create models that may be used to facilitate aspects of run-time operations and analysis. For example, the process model module may be configured to model process work flows (e.g., information associated with processes of an enterprise system, when they access data, whether the accessed data is private or sensitive data, where the data is stored, etc.) or other information, and identify processes that are subject to regulatory requirements. The process model module may also be configured to output information (e.g., information associated with the processes subject to regulatory requirements, information regarding the applicable regulatory requirements, or other types of information) to developers that informs them of the specific processes that are subject to regulatory requirements. The process model module or other functionality of the PPKG system 130 may also provide interactive tools to enable the developers to develop and/or modify process implementations to conform to the identified regulatory requirements.

The data-in-motion rules may be utilized by the PPP system 120 in converting and sharing information between stakeholders, such as to manipulate data at run-time when sensitive data is shared from enterprise system 150 to the supply chain system 170. For example, the enterprise system 150 may utilize the supply chain system 170 to perform an identity verification of a user. The supply chain system 170 may require certain information about the user being verified, such as the user's age, but the age data required by the supply chain system may not require the user's actual age and an age range may be sufficient. The data-in-motion rules may be configured to abstract the user's real or actual age, which may have been provided to the enterprise system 150 with the consent of the user, to an age range suitable for the purposes of performing the verification at the supply chain system 170, thereby allowing the enterprise system 150 to provide the data needed by the supply chain system 170 (e.g., data representing the user's age specified as a range instead of the user's actual age) to perform the identity verification without sharing sensitive data. Masking the sensitive data (e.g., the user's actual age) in this manner enables the exchange of data between the enterprise system 150 and the supply chain system 170 in a manner that is compliant with applicable privacy regulations or even falling outside of the scope of those regulation. It is noted that masking or concealing the user's age has been provided as a non-limiting example of the data-in-motion rules that may be created and maintained by the IDE module 135.

The IDE module 135 may also include an analytics design module 312 that provides one or more analytics tools providing visibility into databases (e.g., the data lake 140 or other databases) and functionality for creating analytical queries to extract information from the databases. The analytics tools of the analytics design module 312 may be used to examine analytics results and use data sets obtained or derived from the analytics results (or other sources) for various processes, such as training AI algorithms. For example, the analytics tools may be used to derive or define privacy impact analytics, structure citizens transparency reports, and define risks calculations and privacy exposure. The visibility into databases provided by the functionality of the analytics design module 312 may enable the IDE module 135 to determine which processes of the enterprise system 150 can access data stored in different databases. These capabilities may be used to detect situations where different units of the enterprise system 150 may be able to access sensitive user data without having to obtain appropriate consent or without having the sensitive data be processed (e.g., by the data-in-motion rules). This functionality enables analysis and testing for regulatory compliance with respect to the processes of the enterprise system 150 to be performed in a regulatory compliant manner (e.g., because sensitive data may not be utilized during testing).

The IDE module 135 may also provide a set of content creation tools that include a privacy rules module 314. The privacy rules module 314 may be configured to use natural language processing (NLP) to semi-automatically model privacy rules and regulations. For example, the privacy rules module 314 may leverage NLP to analyze information associated with privacy rules and regulations to extract information relevant to the privacy rules and regulations and then construct a model of those rules and regulations.

The set of content creation tools may also include an ontologies module 316. The ontologies module 316 may be configured to generate and verify knowledge graph models. For example, the ontologies module 316 may generate a knowledge graph model and then verify the knowledge graph module based on actual instantiation of testing data corresponding to the knowledge graph. In an aspect, the ontologies module 316 may merge several ontologies, as well as create a unique combination of privacy, legal, risk, and domain relations, all configured towards individualized privacy agreements aligned with particular services (e.g., services provided by the enterprise system 150). The resulting ontologies and created privacy rules may be injected into a privacy-aware process model module that enables business process owners, operators and designers, to understand and simplify the implementation of privacy regulations. The tool(s) of the IDE module 135 may proactively suggest what privacy rule(s) to implement or enforce for a given service or function of the enterprise system 150. For example, functionality or services provided by the enterprise system 150 may be designed, analyzed, and modeled. Subsequently, the processes used to provide that functionality or those services may be identified as utilizing information that is subject to one or more privacy regulations (e.g., based on the privacy rules and regulation model(s)) and those processes may be flagged or otherwise brought to the attention of software designers responsible for creating the software corresponding to that process.

The flagging of the process may include providing information on the specific regulations that apply to that process, the requirements of the regulations, the point or points within the process where sensitive data subject to the regulations occur (e.g., points where sensitive data is obtained or requested from the user, stored at the enterprise system 150 or elsewhere, output by the enterprise system 150, shared by the enterprise system 150, etc.), processes that access or store sensitive data, other types of information, or combinations thereof. This may allow the rapid identification of points within run-time or designed processes where issues related to regulatory compliance may arise and allow the software or other implementation specific aspects of the process to be modified to conform to the requirements of the applicable privacy regulations. To illustrate, identifying the points in the processes where sensitive data is requested from users or retrieved from a database may be used to determine whether the sensitive data is actually needed by each of the processes. If the sensitive data is not needed, or less data is needed, the developer can modify the processes to request less data or not request any sensitive data at all. Additionally, where sensitive data is stored by processes, the above-described functionality may be used to determine if multiple instances of the sensitive data are being stored (e.g., by different processes), which may enable the design of those processes to be modified such that a single instance of the sensitive data may be stored (e.g., instead of having multiple instances of the sensitive data being stored) and the single instance of the sensitive data may then be used by two or more processes. Additionally or alternatively, one or more of the processes may be modified to not create a redundant instance of the sensitive data.

As can be appreciated from the foregoing, the ability to analyze processes used to provide services and functionality to users to identify instances where sensitive data is requested, accessed, stored, etc., as well as privacy regulations that are applicable to the types of sensitive data involved, may enable processes to be designed in a manner that is compliant with applicable privacy regulations. Additionally, the various tools provided by the IDE module 135 may enable the developer(s) to rapidly implement changes to the specific processes where the sensitive data is involved. Moreover, once the initial analysis is performed and modifications are completed, the designed functionality and services may be deployed to the enterprise system 150. Once deployed, any changes to the privacy regulations may be incorporated into the ontologies maintained by the PPKG system 130 (e.g., a privacy regulations ontology) and the tools provided by the IDE module 135 may be utilized to rapidly analyze the deployed functionality to determine whether changes in the privacy regulations result in recommendations to modify any of the processes utilized to provide the deployed services or functionality of the enterprise system 150, as described above.

The IDE module 135 may also include a data collection module 318. In some aspects, the data collection module 318 may be an extension to a process model module 324. As explained above with reference to FIG. 1, the process model module 324 may be configured to generate information that enables users associated with the enterprise system 150 or the supply chain system 170 (e.g., process owners, operators, and designers) to understand and simplify the implementation of privacy regulations. For example, the process model module 324 may provide interactive tools that proactively suggesting what privacy rules should be implemented (e.g., based on analysis of aspects of a process. In some aspects, the process model module 324 may evaluate data that a process consumes, shares, and/or stores, as well as regulatory requirements, to identify regulatory requirements that are applicable to the evaluated processes, determine and output information associated with recommendations regarding the regulatory requirements that are applicable to the evaluated process and which specific processes are affected by the identified regulatory requirements. The process model module 324 may also provide relevant codes and hooks into the run-time environment of the PPP system 120, which may be used by the PPP system 120 to validate the processes are functioning in compliance with the regulatory requirements. The data collection module 318 may be configured to construct individualized privacy agreements based on specific processes or needs for access to private data. The data collection module 318 may also support the ability to re-negotiate a privacy agreement with a user, as well as define generic versus specific type of consents (e.g., consent agreements where a user grants broad rights for use of private data, such as for any services provided by the enterprise system 150, versus narrow rights for use of private data, such as for a specific service of the enterprise system 150 but not for other services), or data sharing limitations that may impact the individualized experience of users accessing the enterprise system 150. As explained above, in some use cases the individualized user experience may play a role in achieving desired outcomes, such as achieving regulatory compliance, increasing business value, faster execution or process completion times, or other types of impacts.

The IDE module 135 may also include a data-in-motion rules module 320 configured to construct relationships between stored data (e.g., data stored by users, enterprise systems, and supply chain systems) with regards to data manipulations that may be performed as the data passes between different entities (e.g., different enterprise systems 150 and/or between an enterprise system 150 and a supply chain system 170). The relationships constructed by the data-in-motion rules module 320 may be subsequently deployed and activated by the PPP system 120, as described in more detail below. The IDE module 135 may also include a knowledge graph (KG) management module 322 configured to provide and interact with schemas and ontological instances generated by the IDE module 135. The KG management module 322 may manage versioning, including the creation, deletion, and exportation of these data structures, which may be captured in a knowledge graphs database (e.g., a database maintained by the KG module 138, which may include one of the databases 134).

The PPKG system 130 may also include a KG module 138. The KG module 138 may be configured to maintain design data 332 and analytics processing data 334 generated by the IDE module 135. For example, the design data 332 may include ready to be deployed algorithms and software development kits (SDKs), which may be injected into the PPP system 120 to aid in run-time analysis and monitoring of the enterprise system 150, the supply chain system 170, or both. Similar to software development tools, the KG module 138 may maintain the static source code of a dynamic system. As such, the design data 332 may maintain ontologies in different levels of abstractions, domain specific languages, data-in-motion rules, and any other structured schema that may be utilized in an interactive fashion with the modeling tools of the PPKG system 130. Additionally, the KG module 138 may maintain analytics processing data 334, which may include information associated with various analytics processes or models used to analyze, monitor, and evaluate processes for privacy compliance. For example, the analytics processing data 334 may include information associated with machine learning (ML) network architectures tuned for different AI analytics missions of the analytics processes, model verifications, and privacy-by-design needs. The information maintained by the KG module 138 may act as a library of reusable architectures that may be used to configure processes for analyzing, evaluating, or monitoring privacy-by-design functionality based on with various specific or generic ontologies.

As explained above with reference to FIG. 1, the PPKG system 130 includes a data management module 136 that may be configured to manage the processes for accumulating training data (e.g., data that may be used for training ML/AI processes for analyzing privacy aspects of the enterprise system 150 and/or the supply chain system 170) and case study testing data utilized by the IDE module 135. The data management module 136 may also be configured to provide connectivity to the run time manifestation of the PPP system 120. As such, the data management module 136 may include a PPKG manager 354 configured to build and deploy the content packages resulting based on outcomes of the operations of the above-described functionality provided by the IDE module 135. For example, processes providing various aspects of the privacy preserving techniques disclosed herein may be designed using ontologies and other information produced by the IDE module 135 and compiled into executable code that may be deployed by the PPKG manager 354 to the PPP system 120 or other systems. In addition to providing visibility with respect to versions and packaging, the PPKG manager 354 may extract needed artefacts into a deployable binary that may be consumed by the PPP system 120.

The data management module 136 may also provide functionality to maintain visibility and control over synthetic and testing data used by the different tools of the IDE module 135. For example, the data management module 136 may include a synthetic data generator 352. The synthetic data generator 352 may be configured to visualize data elements and create synthetic or anonymized private data that may be utilized to train the ML/AI models of the IDE module 135 and/or be used for testing purposes. In some aspects, the creation of synthetic data may include labelling of data elements needed by other tools (e.g., the analytics design module 312), such as labelling portions of the training data to indicate particular pieces of synthetic data are private data. As described above, the synthetic data may be stored at the one or more databases 134 as training data 342 or as process testing data 344. In some aspects, the data used to create the synthetic data may be gathered for training purposes using a process controller 356. The process controller 356 may be configured to enable direct connectivity into the PPKG system 130 from external systems, such as the enterprise system 150, or another system. In some aspects, the data management module 136 may include a configurator 360 providing functionality for configuring run-time data sources, connectors, adapters, and other data sets utilized by the IDE module 135.

The data management module 136 may include a data manager 358 configured to collect the training data 342 and testing data 344 used by the IDE module 135. The training data 342 and testing data 344 may be stored at the one or more databases 134. As briefly described above, the training data 342 and testing data 344 may be stored as anonymized or synthetic data sets that may be used by the IDE module 135 to train and test KG analytics and ML processes.

As briefly described above, the data lake 140 may be configured to store data that may be used for privacy related testing, as well as data that may be extracted for testing purposes (e.g., the process testing data 344, which may be anonymized by the synthetic data generator). The data lake 140 may include a database 374 configured to store data, such as data from which the training data 342 and the process testing data 344 may obtained (e.g., after anonymization). The data lake 140 may also include a data extractor 370 configured to create a buffer or interface between the PPKG module 135 and the data stored at the database(s) 374. The data extractor 370 may utilize a schema-based approach for data management (e.g., data acquisition and distribution). An anonymization engine 372 of the data lake 140 may provide functionality configured to ensure that any private data provided from the database 374 to the IDE module 135 and/or the data management module 136 has been anonymized and cleansed (e.g., in coordination with information requested by the synthetic data generator 352). For example, the original (non-anonymized) data may reside in the database 374 of the data lake 140 and the anonymization engine 372 may retrieve and anonymize the data in response to a request from the synthetic data generator 352. It is noted that requests for data from the synthetic data generator 352 may be received directly by the anonymization engine 372 or may be received via the data extractor 370. Once anonymized, the data may be transmitted outside of the data lake 140. In an additional or alternative aspect, data may be anonymized prior to being provided to the data lake 140.

Using the above-described modules of the PPKG system 130 and the data lake 140, various operations of the enterprise system 150 or other systems may be analyzed, ontologies representative of those systems may be generated, and testing/analytics may be performed to identify potential data flows and processes where use of sensitive data may raise issues with respect to privacy regulations. Once identified, those processes may be analyzed for compliance and any non-compliant or at risk processes may be flagged for refinement via the IDE module 135. For example, a process flagged as providing functionality that is not compliant with a privacy regulation may be loaded into the IDE module 135 and the software (e.g., the software including the flagged process) may be modified to bring that functionality into compliance. The analytics and AI algorithms created by the analytics design module 312 may also be configured to make recommendations on changes to improve the compliance of the flagged process, such as to create data-in-motion rules (e.g., via the data-in-motion module 320), suggest data-in-motion rules that may be utilized to improve compliance of the flagged process, or other types of recommendations. Once the software is updated, the updated code may be compiled and stored by the data management module 136 (or sub-component or module of the data management module 136). The software code created using the IDE module 135 may be written in one or more programming languages (e.g., C++, Java, python, pearl, etc.) and compiled to produce executable code that may then be deployed to run-time portions of the relevant system to bring that system into compliance with appropriate regulatory requirements.

As shown above, the PPKG system 130 may provide various types of functionality to facilitate operations for testing regulatory compliance of external systems, such as the enterprise system 150 of FIG. 1 and/or the supply chain system 170 of FIG. 1. Such functionality may include creating ontologies (e.g., ontologies of external system process flows, regulatory requirements, etc.), creating and training ML/AI models, performing analytics with respect to external system processes (e.g., to identify where private data is utilized or accessed in an external system process, determine risks with respect to processes using data subject to regulatory requirements, etc.), generate training and testing data, anonymization of data, and other functionality. Such functionality enables the PPKG system 130 to test and analyze the external system processes for compliance with regulatory requirements in a manner that does not run the risk of being non-compliant with those same regulatory requirements (e.g., through the use of data anonymization, etc.). Moreover, the PPKG system 130 provides functionality that enables the code for the analyzed processes to be flagged for non-compliance, modified, compiled, and then redeployed to the external system so that the external system may be operated in compliance with the regulatory requirements. It is noted that the various tools and functionality of the PPKG system 130 may decrease the amount of time required to evaluate regulatory compliance, as well as the amount of time required to bring any non-compliant processes back into compliance, thereby reducing the development lifecycle and potential system downtimes.

While the PPKG system 130 provides functionality for evaluating external system processes for regulatory compliance and modifying the code of external system processes when those processes are not compliant, aspects of the present disclosure also provide functionality for monitoring run-time environments for regulatory compliance and other process optimizations. For example, as briefly described above with reference to FIG. 1, the PPP system 120 may provide a runtime manifestation of the software created via the PPKG system 130. For example and referring to FIG. 2, a block diagram illustrating exemplary aspects of run-time functionality provided by a system architecture in accordance with aspects of the present disclosure is shown The PPP system 120 may include an analytics engine 210 that enables activation and presentation of created unified analytical queries, on top of production or testing data. In some aspects, the analytics engine 210 may utilize AI to evaluate analytics of run-time processes and systems (e.g., the processes of the enterprise system 150 of FIG. 1). In some aspects, the analytics engine 210 may utilize a reduced version of the analytics tools created using the analytics design module 312 of the PPKG system 130. The reduced version of the analytics tools may be adapted to configure data sources and activate pre-trained machine learning, graph neural networks, or conventional and discrete graph algorithms and activate the analytics as needed (e.g., on demand).

The PPP system 120 may include various process adapters 212 configured to connect the PPP system 120 to monitored environments in connection with providing privacy-aware services, such as privacy aware services involving the user device 110, the enterprise systems 150, and the supply chain systems 170. The PPP system 120 may also include a private data collector 214 configured to collect private data (e.g., from the user device 110). For example, the process adapters 212 and the private data collector 214 may be utilized to provide new private data items to a privacy database of the PPP system 120 (e.g., database 124 of FIG. 1) or consume private data previously populated within the privacy database of the PPP system 120. The process adapters 212 may also be utilized to connect the PPP system 120 to external systems in order to send the private data to different processes, such as processes of the enterprise system 150 of FIG. 1 or the supply chain system 170 of FIG. 1. In some aspects, the process adapters 212 and/or the private data collector 214 may integrate API adaptations between different instantiated business processes schemas of the enterprise system 150 in order to collect and share private data management aspects at run-time and to monitor the execution of the process according to process models (e.g., process models generated using the IDE module 135).

As an example, if a payment process collects financial card information, the collection of that sensitive data may be reported to the PPP system 120, which may track the fact that this specific type of sensitive data (e.g., the financial card information) has been collected and also track the location in the enterprise system 150 where the sensitive data has been stored. Thus, the PPP system 120 may track the types of sensitive data that enterprise system 150 collects, as well as track the locations where that data is stored. In a situation where the payment process attempts to use existing stored financial card information and owners details, that process can request the stored financial card information from the process adapters 212.

The PPP system 120 may include a private data manager 216 configured to retrieve sensitive data (e.g., the financial card information) stored by the PPP system 120, record the locations where instances of obtained sensitive data are stored, and process identifiers associated processes that access or use sensitive data. This data may be utilized construct privacy canonical knowledge graphs 232 via a KG instance builder 218 of the PPP system 120. For example, the KG instance builder 218 may be configured to receive information associated with the processes of an enterprise system 150 that access or utilize private data and locations where the processes store the private data within the enterprise system. The KG instance builder 218 may then construct a knowledge graph that includes information associated with the processes that utilize private data, as well as where each process stores the private data. Such KGs may enable identification of situations where multiple copies of the same private data are stored at the enterprise system 150, as well as identification of potential optimizations to the processes of the enterprise system 150 (e.g., configuring a common storage location for the processes that utilize the same private data).

Similarly, the PPP system 120 may include a supply chain process broker 220 configured to link third party business processes and services (e.g., processes and services of the supply chain systems 170) in run-time with the PPP system 120. The supply chain process broker 220 may be configured to evaluate whether data may be shared or consumed according to metrics associated with potential risk and trustworthiness of the relevant supply chain systems 170. Based on the metrics, the supply chain process broker 220 may either provide a sub-set of the data or an anonymized version of the data to those third party processes or services. The PPP system 120 may also include a configurator 222 providing functionality for configuring run-time data sources, connectors, adapters, and other data sets utilized to communicate with external systems or components (e.g., the PPKG system 130, the enterprise systems 150, the supply chain systems 170, and the like).

Figure 2:
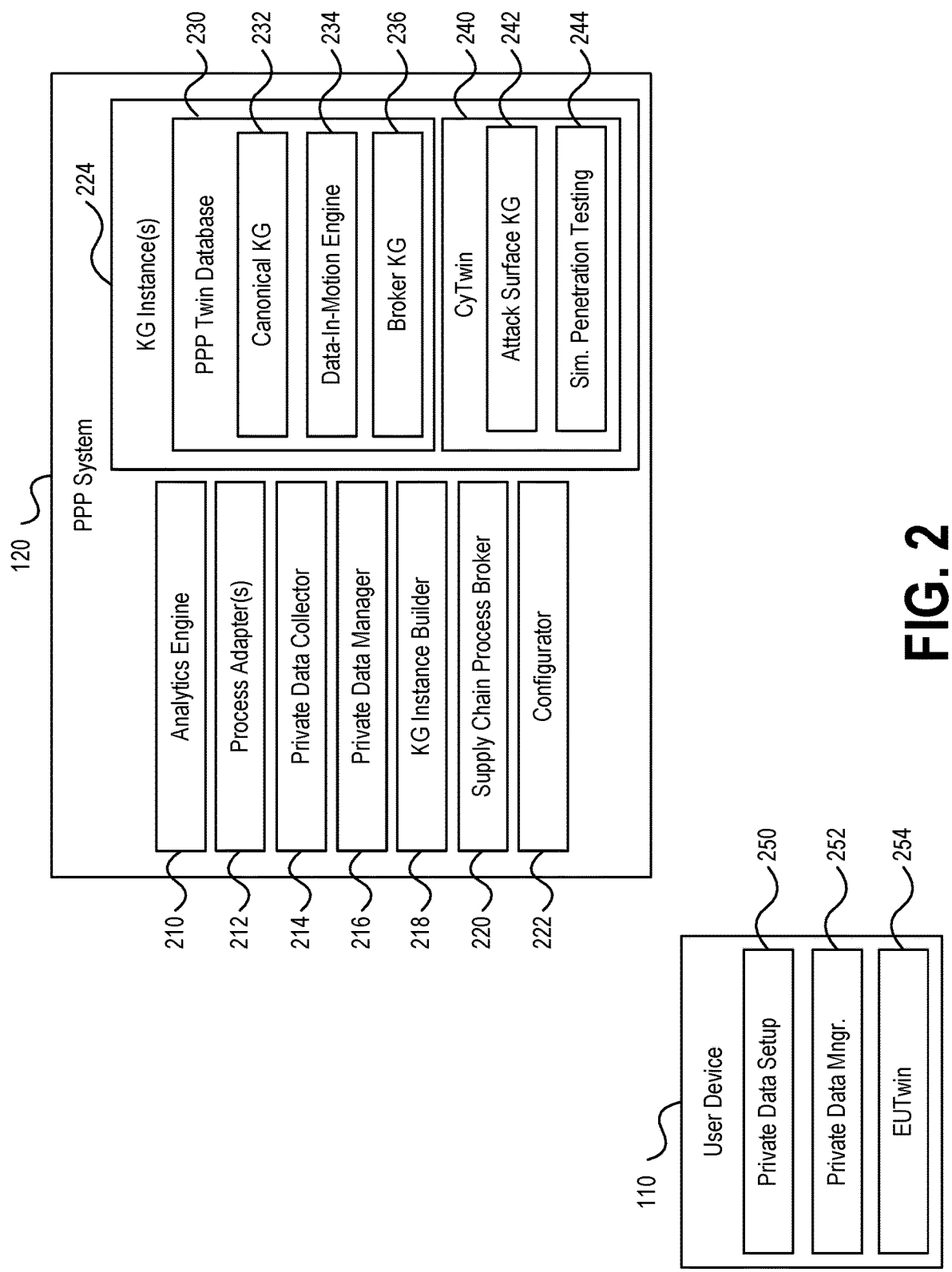
FIG. 2 is a block diagram illustrating exemplary aspects of run-time functionality provided by a system architecture in accordance with embodiments of the present disclosure.

In some aspects, the PPP system 120 may maintain received private data within the a privacy preserving posture (PPP) twin database 230. The PPP twin database 230 may include the canonical KGs 232, a broker KG 236, and a data-in-motion engine 234. As explained above, the canonical KGs 232 may be generated based on sensitive or private information obtained or received by the PPP system 120. When private data is shared or provided to a supply chain system 170, the private data may be stored in a canonical KG 232 and information associated with the shared private data may also be stored in a broker KG 236. The population of the data and its associations within the canonical KG 232 and the broker KG 236 may be performed via the KG instance builder 218. As an example, if a third party payment operation processor (PBOP) interacts with a retailer system (e.g., an enterprise system 150) in order to retrieve financial card information and the name of financial card holder for completing a one-click payment process, the supply chain process broker 220 can check for private data existence. Using the private data manager 216 of the PPP system 120, the supply chain process broker 220 can retrieve that data, and record the location of the copy of the data and PBOP ID at the broker KG instance via the KG instance builder 218. As shown in FIG. 2, the PPP twin database 230 may also include a data-in-motion engine 234, which may be used to abstract or anonymize data shared with supply chain systems based on the canonical KG 232 and the broker KG. As described above with reference to FIG. 3, the data-in-motion engine may utilize data-in-motion rules generated by the PPKG system 130.

Interactions with users outside the scope of the monitored processes may be facilitated via a private-data collector 214, which may be activated according to designed negotiations and implications of private data dependent services. The private data manager 216 may provide visibility and configuration control into the status of data based on KG instances, which may enable the update and extraction of relevant data while the KG instance builder 218 populates and updates data within the canonical KG 232 and the broker KG 236. For example, the data within the canonical KG 232 and broker KG 236 may be populated according to predefined ontologies and processes, as defined by the private data collected or data-in-motion streaming sources and ontologies.

The PPP system 120 may also include a knowledge graphs module, which may serve as the repository for the sensitive information shared with the enterprise system 150 and the supply chain systems 170. The data stored in the repositories by the knowledge graphs module may also be the source of sensitive data records at the entity level, rather a business or record set level. Namely, separate information on data fields not in the context of business processes mapped into business processes. The data-in-motion engine 234 may be provided to implement data-in-motion modification rules as well as providing alerts for investigated data types. For example, the data-in-motion engine 234 may apply data-in-motion rules generated by the PPKG system 130 to anonymize or abstract data provided to the enterprise system 150 when that data is shared with the supply chain system 170, as described above. In an aspect, the applied data-in-motion rule(s) may be selected or determined based on a type of the sensitive or private data being shared to the supply chain system 170 and a data requirement of the supply chain system 170. For example, where the type of sensitive data is an age and the data requirement of the supply chain is an age range, the data-in-motion rule may be configured to modify the sensitive data such that an age range within tolerable limits of the supply chain system 170 without providing the actual age of the user.

As shown in FIG. 2, the PPP twin database 230 contains the canonical KGs 232. As described above, the canonical KGs 232 may provide an instance that contains the run-time collected sensitive data from end-users (e.g., operators of the user devices 110), which may be mapped to the locations where that data is accessed, consumed, and stored within the enterprise system 150. The canonical KGs 232 may be linked to a hyper-personalized business process that uses that data. As such, the canonical KGs 232 may contain a unified and fused structure, data trust level, and location of the private data. Namely, in order to handle compliance requirements, the canonical KGs 232 may contain, for each end-user that has relations with the enterprise system 150 associated with or monitored by the PPP system 120, information related to what private data has been collected, why and when it was needed, and where the data resides so that it may be protected, modified, and controlled to preserve the privacy of the data (e.g., prevent unauthorized sharing, access, or distribution of sensitive data in a context for which the user may not have provided appropriate consent). The creation of the associations may be done by the KG instance builder component 218, as described above. The associated processes identification, including permutation of processes, may be provided by the PPKG system 130, and the actual private data values may be provided either by the process adapters 212, by the private data collector 214, or the private data manager 216, as described above.

As briefly explained above, the PPP twin database 230 may also include a broker KG 236 that operates in a manner similar to the canonical KG 232, but that contains evidence for sharing or consuming private information with the supply chain system 170. For example, the broker KG 236 may contain a subset of the data associated with the canonical KG 232 and may indicate with which suppliers each piece of sensitive data has been shared, why it was shared, and when it was shared. In addition, the broker KG 236 may contain information regarding potential data and privacy risks emanating from the supply chain system 170 (or the enterprise system 150) for potential breach impact analysis, as described in more detail below.

The PPP system 120 may also include a cyber digital twin (CyTwin) 240 configured to maintain an attack surface KG 242. As another form of knowledge graph database, the attack surface KG 242 may contain information associated with attack pathways and vectors, generating information related to an attack surface within the enterprise system 150 (or the supply chain system 170) that is tailored towards privacy related targets, such as a certain location of databases that contain private or sensitive information. The CyTwin 240 may also contain simulated penetration testing functionality 244 that automatically simulates potential activation of penetration testing, conducted in scale for all the canonical KG 232 targets. The penetration testing may follow an initial attack modeled by a user (e.g., a white hat hacker or other individual with experience in cyber threat detection, mitigation, and analysis). As such, the CyTwin 244 may simulate and examine the ability to compromise sensitive data locations as targets and recommend remediations to increase cyber resiliency and compliance adherence of the enterprise system 150 and/or the supply chain systems 170.

In addition to providing capabilities to analyze how sensitive data is collected, accessed, and shared by the involved systems and devices (e.g., the user devices 110, the enterprise systems 150, and the supply chain systems 170), the functionality provided by the PPP system 120 and the PPKG system 130 may facilitate analysis of how user consent may impact the services and processes that consume or otherwise utilize sensitive user data. For example, in some use cases, a retailer bank collects private data from a set of users, where the users are providing a set of information within the scope of a relevant privacy agreement (e.g., an understanding that the provided data is to be used for a specific purpose). Consequently, users in such use cases may be served with individualized hyper-personalized services that fit within the user approved privacy agreement(s) and uses of such data outside those agreements (or consents) may result in non-compliance with one or more applicable regulatory requirements.

The concepts described above have primarily focused on the PPP system 120 and the PPKG system 130 and how those systems may be utilized to monitor other entities, such as the enterprise system 150 and the supply chain system(s) 170, as well as the services and functionality the enterprise system 150 and the supply chain system(s) 170 provide to end users. However, aspects of the present disclosure also seek to provide transparency to end users (e.g., operators of the user devices 110). To that end, the user devices 110 may include functionality for providing transparency with respect to the sensitive data that is shared by the users and how that data is used by third parties (e.g., the enterprise system 150 and the supply chain system(s) 170). For example, the user device 110 may be configured to maintain the sensitive data that the user is willing to share with third parties, such as the enterprise system 150 and the supply chain systems 170 in a database. The database may enable the user to manage the exposure of the sensitive data, acting as a private data vault for the user's sensitive data. This database, which may be referred to as an end-user twin or EuTwin 254, may contain the accumulation of sensitive data for the user, as well as certificates and credentials. The EuTwin 254 may maintain a snapshot of the sensitive data shared by the user with each different enterprise system 150 for new, existing, and future integrated business processes.

In an aspect, the EuTwin 254 may be provided as a service for the user (e.g., by a third-party privacy preserving service, or embedded within the enterprise systems themselves) via an application running on the user device 110. In an aspect, the service may be provided by a third party. In order to connect with the retailer, a dedicated interface may be provided, shown in FIG. 2 as a private data setup module 250. The private data setup module 250 may be configured to provide sensitive data negotiation functionality that allows the user to interact with the corresponding enterprise system 150. The private data setup module 250 may be provided as standalone functionality (e.g., where the user provides sensitive data to the enterprise system 150 and specifies the appropriate or authorized uses of such data (consent)) or provided within other existing business services, such as a payment service, where the user provides sensitive data as part of another process. A private data manager 252 may provide the user with visibility and configuration control over shared private data for one or more processes of an enterprise system and may enable the creation and extraction of relevant sensitive data from the EuTwin 254.

In addition to consent considerations with respect to the use and access of user sensitive data, some use cases may involve sharing of sensitive data that was previously collected (e.g., by an enterprise system) within an ecosystem (e.g., a supply chain ecosystem), where the suppliers should receive some sensitive data regarding the user, yet the shared data may be modified in order to minimize the exposure of the shared data. In addition, once shared, the enterprise system 150 should validate proper requests and reporting with respect to the handling of the shared data by or with the supply chain systems 170. An example is suspected fraud reporting, where there is a need to alert an ecosystem of banks or selected partners on suspicious accounts and user behavior, such as excessive withdrawals. However, such functionality should be performed without impacting the user in cases where the suspected behavior is not fraud. Another example is where a retailer asks a bank to perform a credit level approval for an existing consumer in order to ensure payment. Both may affect the payment interaction service with the consumer and potentially trigger a change in credit or other optimization of the business service subject to analysis of additional private data, such as balancing cash flow across several banking accounts of the consumer.

In the exemplary and non-limiting use cases described above, the various privacy protection and verification activities are conducted for the benefit of the user and adjusted according to the type of sensitive data collected or shared by the parties. The provided explainability to the user and rationale of the private data usage may an increase the trust level of the user with the entities involved, allowing the those entities to share the data in order to provide improved service value. As such, the ability to share sensitive data may impact the enterprise system's service offerings as well as the relevant supply chain and potential levels of hyper-personalization that may be provided to a user.

It is noted that the system architecture illustrated and described with reference to FIGS. 1-3, while having primarily been described using financial transaction related use cases, are not limited to such use cases. To illustrate, consider the impact that COVID-19 has had. Since the spread of COVID-19 began, deployment of applications designed to track user locations and health status have been widely deployed. The information maintained by such applications is highly sensitive and the applications capturing such information should be designed to ensure that the sensitive data they collect from users is not utilized for other purposes (e.g., purposes other than those which the user understands and has agreed to allow the application to collect health and location data of the user). Thus, it should be understood that the disclosed system architecture provides a framework for providing privacy aware services and functionality that are capable of triggering changes in processes and service levels based on the ability to access and share appropriate portions of a user's sensitive data. Such capabilities may enable the design and execution of active privacy-aware processes that operate in a manner that seeks to utilize a minimal amount of sensitive data to support operations of business processes on behalf of users according to the privacy agreement (i.e., the user's consent to use the sensitive data for specific or general purposes) and across the supply chain.

As shown above, the system architecture of FIGS. 1-3 provides functionality for balancing privacy risk and controlling user service levels according to the sensitive data the user opts to share with enterprise systems and supply chain systems, while enabling those systems to guarantee privacy compliance in an easy and frictionless manner. Additionally, the disclosed system architecture provides automated tools for providing privacy-by-design capabilities that may be used during process design, and connects privacy (data usage and management) with cyber security risks (data theft and access) implemented within monitored systems and contextual applications. These tools may support subject matter experts, such as process model modules and service designers or software developers, without prior knowledge of security and privacy, and aid the creation of privacy compliant and trustworthy digital services. Moreover, the system architecture also provides tools that provide functionality that allows users to manage their own sensitive data in a trusted manner in accordance with privacy laws and individualized parameters given by the user.

In addition to providing tools to enable programmers or other persons to design and program privacy compliant services and functionality, the disclosed system architecture may also provide functionality that enables users to transparently view the sensitive data they have shared with third parties. For example, the user may be able to view the snapshots of the sensitive data shared with third parties, the processes and external systems (e.g., the enterprise systems 150 and/or the supply chain systems 170) each piece of sensitive data that is shared, where the data is stored, the consent or purpose for which the shared sensitive data was authorized by the user, or other types of information that provides the user with knowledge of the sensitive data shared with third parties. In some aspects, the user may also be provided with functionality to delete or reduce access to the shared sensitive data. For example, the user may view the data that the user has shared with third parties and may determine to delete certain private data that the user has shared. When the user deletes the data, the third party system (e.g., the enterprise system 150 and/or the supply chain system 170) may also delete any instances of that data from the system. Additionally, when access to shared data is reduced or shared data is deleted, the user may be notified of how such changes may impact the services and service levels provided by the process(es) for which access to the shared data has been removed or deleted.

Figure 3:
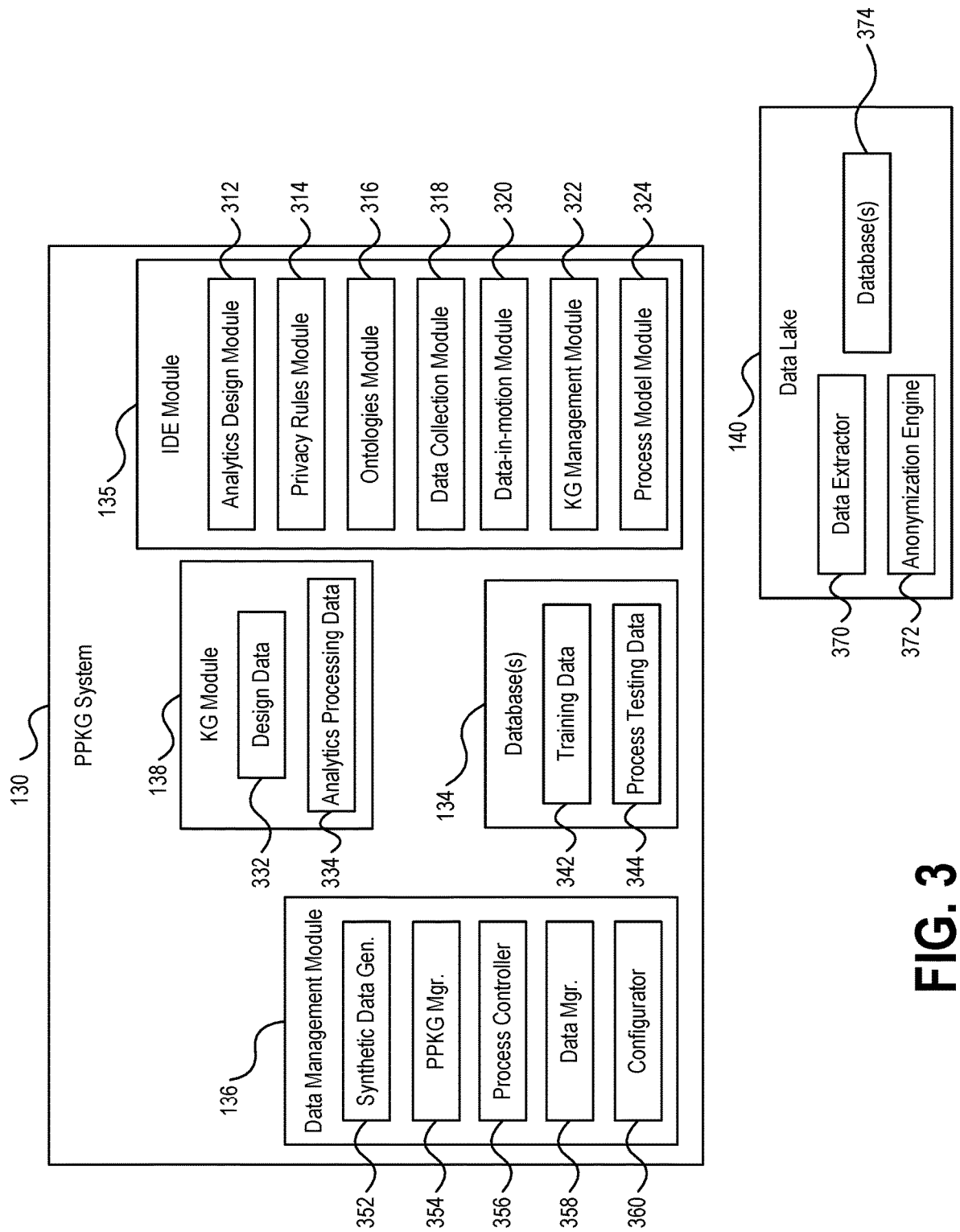
FIG. 3 is a block diagram illustrating exemplary aspects of design-phase functionality provided by a system architecture in accordance with embodiments of the present disclosure.

It is noted that while FIGS. 1-3 illustrate the PPP system 120 and the PPKG system 130 as being separate systems, such illustration has been provided for purposes of highlighting the design-phase and run-time operations provided by embodiments of the present disclosure and is not intended to require that these two systems be separate systems. Instead, it is to be understood that the functionality provided the PPP system 120 and the PPKG system 130 may be integrated into a single system or more than two systems. Regardless of how the run-time and design-phase functionality are implemented (e.g., a single system, multiple systems, a cloud-based implementation, etc.), it is to be appreciated that embodiments of the present disclose enable systems and processes to be designed and deployed in a manner that provides an increased level of trustworthiness to users that their rightfully and legally consumed private data is diligently maintained with high security. Moreover, the ability of the PPP system 120 to monitor the privacy-aware business processes and capture related data usage enables improper sharing of data internal to a single system (e.g., an enterprise system 150) to be identified, such as when a process shares the user's private data with another process for which the user has not provided consent. Such capabilities increase the privacy posture of the enterprise systems and enables the resiliency of the enterprise to improve over time (e.g., as the processes of the enterprise system are monitored and modified to improve regulatory compliance). Additionally, the PPKG system functionality also enables any non-compliant aspects of an implemented process to be rapidly redesigned with privacy compliance in mind and allows processes to be more easily updated as changes in privacy regulations occur, thereby minimizing or eliminating the occurrence of non-compliant processes. Such capabilities represent a significant improvement over previous systems for designing privacy compliant processes.

Figure 4:
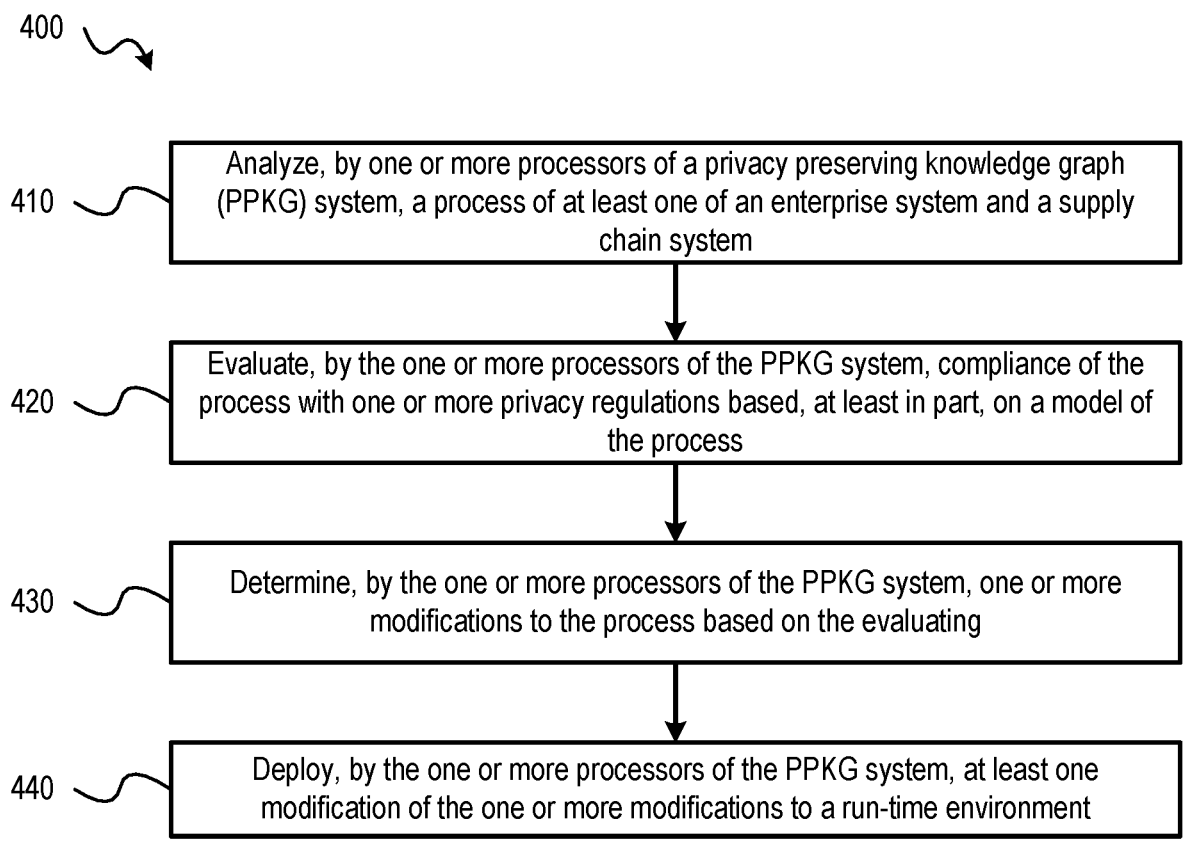
FIG. 4 is a flow diagram illustrating an exemplary method for design-phase functionality in accordance with aspects of the present disclosure.

Referring to FIG. 4, a flow diagram illustrating an exemplary method for design-phase functionality in accordance with aspects of the present disclosure is shown as a method 400. In an aspect, the method 400 may be performed by a PPKG system, such as the PPKG system 130 of FIG. 1. Steps of the method 400 may be stored as instructions (e.g., the instructions 133 of FIG. 1) that, when executed by one or more processors (e.g., the one or more processors 131 of FIG. 1), cause the one or more processors to perform the steps of the method 400.

At step 410, the method 400 includes analyzing, by one or more processors of a PPKG system, a process of at least one of an enterprise system and a supply chain system. The analyzed process may be a process provided by the enterprise system (e.g., the enterprise system 150 of FIG. 1) or a process of a supply chain system (e.g., the supply chain system 170 of FIG. 1). As described above, the processes analyzed by the PPKG systems of embodiments may be processes that are configured to utilize sensitive data of a user, such as payment processes, identify verification processes, and the like. It is noted that the processes analyzed by the PPKG system in accordance with the method 400 are not limited to financial- or payment-type processes and may include other types of processes, as described above.

At step 420, the method 400 includes evaluating, by the one or more processors of the PPKG system, compliance of the process with one or more privacy regulations based, at least in part, on a model of the process. As described above, the PPKG system may generate various ontologies that represent the process, interaction of the process with a user device, interaction of the process with third party systems (e.g., supply chain systems), regulation requirements associated with sensitive data (e.g., data subject to GDPR or CCPA regulations), and other types of system requirements. These ontologies may be generated based on information obtained via the analyzing and used to model the process.

At step 430, the method 400 includes determining, by the one or more processors of the PPKG system, one or more modifications to the process based on the evaluating. As described above, the modifications may include modifications to improve regulatory compliance, such as modifying user consent with respect to sensitive data so that the process utilizes the sensitive data in a manner consistent with the user consent. Additionally, the modifications may include actions to eliminate the applicability of regulatory requirements where possible, such as by creating and applying data-in-motion rules that may be used to obfuscate or anonymize data, thereby making the sharing of the anonymized data fall outside the scope of at least some, if not all, privacy regulations. Modifications may also include modifications to the process itself (e.g., to create a more efficient process that requires less time to complete or is less likely to fail), which may or may not be performed for purposes of improving or guaranteeing regulatory compliance. In an aspect, the modifications may include generating software code (e.g., written in a programming language using the IDE module 135 of FIGS. 1 and 3) that may be compiled to produce executable code configured to modify one or more run-time aspects of the process, such as to change a flow of data, how the process shares data, or other changes.

At step 440, the method 400 includes deploying, by the one or more processors of the PPKG system, at least one modification of the one or more modifications to a run-time environment. For example, where the modification(s) include generating executable code, the executable code may be deployed to a run-time environment so that future executions of the process are based on the newly created executable code that was modified in step 430. As another example, deploying the at least one modification may include associating one or more data-in-motion rules with a process or specific part of the process (e.g., sharing sensitive data with a supply chain system). In such instances, the modification, once deployed, may result in data-in-motion rules being applied by the process, thereby increasing the likelihood that the process complies with regulatory requirements (or falls outside the scope of the regulatory requirements) for at least the portion of the process related to the use of the data-in-motion rules. It is noted that the method 400 may also include additional features and steps consistent with the description of the PPKG system 130 with respect to FIGS. 1 and 3. Accordingly, it is to be understood that the method 400 is not to be limited to the specific steps illustrated in FIG. 4 and described above and instead may include steps corresponding to any of the functionality disclosed herein as being provided by the PPKG 130 of FIGS. 1 and 3.

Figure 5:
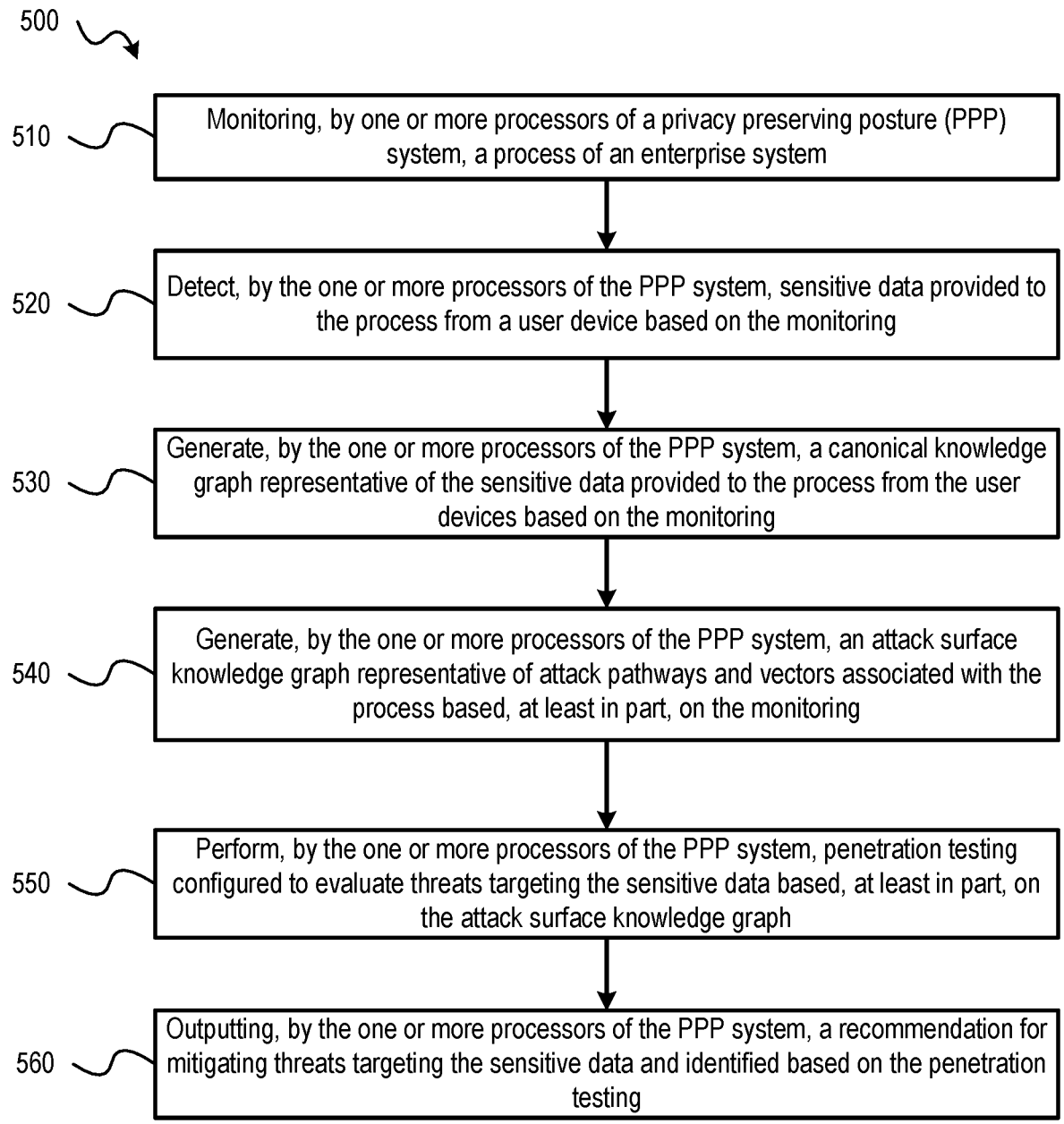
FIG. 5 is a flow diagram illustrating an exemplary method for run-time functionality in accordance with aspects of the present disclosure.

Referring to FIG. 5, a flow diagram illustrating an exemplary method for run-time functionality in accordance with aspects of the present disclosure is shown as a method 500. In an aspect, the method 500 may be performed by a PPP system, such as the PPP system 120 of FIG. 1. Steps of the method 500 may be stored as instructions (e.g., the instructions 123 of FIG. 1) that, when executed by one or more processors (e.g., the one or more processors 121 of FIG. 1), cause the one or more processors to perform the steps of the method 500.

As described above, the PPP system may provide functionality for run-time monitoring of processes designed using a PPKG system (e.g., the PPKG system 130 of FIG. 1). Thus, at step 510, the method 500 includes monitoring, by one or more processors of a privacy preserving posture (PPP) system, a process of an enterprise system. The monitoring performed at step 510 may be performed as the process is invoked to provide functionality to users—that is, the monitoring may be performed as users (e.g., operators of the user devices 110 of FIG. 1) interact with the process to achieve an outcome (e.g., provide payment, authenticate the user's identity, etc.). At step 520, the method 500 includes detecting, by the one or more processors of the PPP system, sensitive data provided to the process from a user device based on the monitoring. As described above with reference to FIGS. 1 and 2, the PPP system may identify points within the process when sensitive data is provided by the user, stored by the enterprise system, shared with a supply chain system, or other types of sensitive data interactions. This information may help the PPP system identify points in the process where sensitive user data enters and exits the process, which may represent points in the process where privacy requirements become applicable, especially when the sensitive data is being shared with third parties (e.g., the supply chain systems 170 of FIG. 1).

At step 530, the method 500 includes generating, by the one or more processors of the PPP system, a canonical knowledge graph representative of the sensitive data provided to the process from the user devices based on the monitoring. As described above with reference to FIGS. 1 and 2, the canonical knowledge graph may be a data repository that identifies the processes that utilize, obtain, or share sensitive user data, where each identified process stores the sensitive data provided by the user(s), which portions of a process were involved in the collection, storage, retrieval, and/or sharing of the sensitive data, or other types of information that provides insights into how sensitive data flows through the enterprise system and its processes. At step 540, the method 500 includes generating, by the one or more processors of the PPP system, an attack surface knowledge graph representative of attack pathways and vectors associated with the process based, at least in part, on the monitoring. As described above, the attack surface knowledge graph may be a data repository that identifies points in the process that may be subject to vulnerabilities through which a malicious actor may obtain access to the sensitive data.

At step 550, the method 500 includes performing, by the one or more processors of the PPP system, penetration testing configured to evaluate threats targeting the sensitive data. The penetration testing may be performed based, at least in part, on the attack surface knowledge graph. For example, the penetration testing may seek to identify ways to exploit the identified vulnerabilities to gain access to the sensitive data. It is noted that other types of testing of the process to identify ways in which malicious actors may obtain access to the sensitive data may also be performed. In addition to malicious actors, the penetration testing may also evaluate whether non-malicious threats can improperly access the sensitive data. For example, the user may provide sensitive data with a consent that the sensitive data may only be used by the process to which the sensitive data was provided, but the enterprise system may store the sensitive data in a manner that makes the sensitive data accessible to other processes of the enterprise system and those other processes may not fall within the consent provided by the user. The penetration testing performed at step 550 may also include testing for such non-malicious vulnerabilities, which may result in the enterprise system failing to comply with applicable privacy regulations and requirements.

At step 560, the method 500 includes outputting, by the one or more processors of the PPP system, a recommendation for mitigating threats targeting the sensitive data and identified based on the penetration testing. For example, the recommendations may include obtaining an updated consent based on the penetration testing revealing that the sensitive data may be accessed by other processes that are outside the scope of the consent obtained from the user. Alternatively, the recommendation may indicate that one or more other processes should be modified to prevent access to the sensitive data due to the lack of consent for those other processes to have access to the sensitive data. For such a recommendation, the PPKG system 130 may be invoked or utilized to modify the enterprise system to prevent access to the sensitive data without appropriate consent. It is noted that the exemplary recommendations described above have been provided for purposes of illustration, rather than by way of limitation and that the method 500 may provide other types of recommendations (e.g., software updated to patch known network vulnerabilities, obfuscation of data via data-in-motion rules, etc.) depending on the particular threats identified by the penetration testing performed at step 550. Additionally, it is noted that the method 500 may also include other operations and functionality described with reference to the PPP system 120 in connection with FIGS. 1 and 2.

As shown above, the method 400 of FIG. 4 and the method 500 of FIG. 5 provide techniques for dynamic analysis of how systems obtain and processes sensitive user data. The method 400 of FIG. 4 and the method 500 of FIG. 5 may enable system designers to achieve privacy-by-design and security-by-design goals utilizing the tools and functionality of the PPKG system and the PPP system of embodiments. These tools and functionality provide for regulatory compliance analysis at both the design phase and run-time phases of a networked environment and provide in-depth analysis of how sensitive data flows from user devices to enterprise system processes and sharing of that sensitive data both within the enterprise system and external systems, such as supply chain systems. The modelling tools leverage artificial intelligence and other modelling and analysis techniques to identify points within a process where the use of sensitive data may raise regulatory compliance issues, evaluate the compliance of those issues, and flag any non-compliant processes for remediation. Additionally, the tools provide for analysis of improper sharing of sensitive data based on user consent or permissions and can dynamically take action to obtain appropriate consent from the user, prevent access for processes for which consent was not granted, or other types of actions designed to mitigate the need for regulatory compliance (e.g., application of data-in-motion rules). Thus, the methods 400 and 500 provide a robust system architecture for managing, designing, and deploying systems that are capable of utilizing sensitive user data while still achieving privacy-by-design and security-by-design goals.

Additional exemplary aspects of the present disclosure are described in the Appendix filed concurrently herewith.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-5) may comprise processors, electronics devices, hardware devices, electronics components, logical circuits, memories, software codes, firmware codes, etc., or any combination thereof. In addition, features discussed herein relating to FIGS. 1-5 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 6-7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
    analyzing, by one or more processors, information associated with one or more privacy regulations of a process of at least one of an enterprise system and a supply chain system,
    wherein the process is configured to utilize sensitive data of a user;
    evaluating, by the one or more processors, compliance of the process with the one or more privacy regulations based, at least in part, on a model of the process,
    wherein the model is generated based on information obtained via the analyzing;
    producing recommendation to modify the process to improve regulatory compliance associated with the one or more privacy regulations based on the evaluating;
    determining, by the one or more processors, one or more modifications to the process based on the produced recommendation;
    generating updated executable code for the process based on at least one modification of the one or more modifications; and
    deploying, by the one or more processors, the updated executable code to a run-time environment, wherein the executable code is executed by the one or more processors to implement the process within the runtime environment.

2. The method of claim 1, further comprising generating one or more data-in-motion rules configured to at least partially anonymize the sensitive data of the user.

3. The method of claim 1, wherein the one or more modifications comprises applying at least one data-in-motion rule of the one or more data-in-motion rules to the process.

4. The method of claim 1, further comprising:
    training an artificial intelligence algorithm based on a set of anonymized data, wherein the analyzing is based on the trained artificial intelligence algorithm, and wherein the artificial intelligence algorithm is configured to determine, at least in part, the modification to the process.

5. The method of claim 4, wherein the training is performed based on data stored at a data lake.

6. The method of claim 1, wherein the analyzing comprises simulating the process using anonymized user data.

7. The method of claim 1, wherein the process comprises sharing the sensitive data provided to the enterprise system by the user with the supply chain system, sharing the sensitive data provided to the enterprise system by the user with another process of the enterprise system or obtaining the sensitive data from the user.

8. The method of claim 1, wherein the analyzing comprises determining whether the process utilizes the sensitive data of the user in accordance with a consent of the user.

9. The method of claim 8, further comprising obtaining an updated consent of the user when the process utilizes the sensitive data of the user in a manner that is not in accordance with the consent of the user.

10. The method of claim 1, further comprising:
    receiving a withdrawal of consent from the user; and
    providing information identifying an impact of the withdrawal of consent to a user device.

11. The method of claim 1, further comprising generating a plurality of ontologies, the plurality of ontologies comprising ontologies associated with privacy, legal, risk, and domain relations, wherein the analyzing is based on at least one ontology of the plurality of ontologies.

12. A method comprising:
    monitoring, by one or more processors, a process of an enterprise system;
    detecting, by the one or more processors, sensitive data provided to the process from a user device based on the monitoring;

generating, by the one or more processors, a canonical knowledge graph representative of the sensitive data provided to the process from the user devices based on the monitoring;

generating, by the one or more processors, an attack surface knowledge graph representative of attack pathways and vectors associated with the process based, at least in part, on the monitoring, wherein the attack pathways and vectors correspond to vulnerabilities through which a malicious actor may obtain access to the sensitive data;

generating, by the one or more processors, a broker knowledge graph representative of the sensitive data shared from the process to a supply chain system based on the monitoring, wherein the broker knowledge graph comprises information that identifies a location of the sensitive data shared with the supply chain system and an identifier associated with the process;

performing, by the one or more processors, penetration testing configured to evaluate threats targeting the sensitive data based, at least in part, on the attack surface knowledge graph; and outputting, by the one or more processors, a recommendation for mitigating threats targeting the sensitive data and identified based on the penetration testing, wherein the recommendation includes at least one modification to executable code for the process wherein the executable code is executable by the one or more processors to implement the process.

13. The method of claim 12, further comprising applying a data-in-motion rule to the sensitive data shared from the process to the supply chain system, wherein the data-in-motion rule is configured to obfuscate the sensitive data shared with the supply chain system.

14. The method of claim 13, further comprising selecting the data-in-motion rule based on a type of the sensitive data and a data requirement of the supply chain system.

15. The method of claim 12, wherein the canonical knowledge graph comprises information that identifies a location of the sensitive data shared with the enterprise system and an identifier associated with the process.

16. A system comprising:
a memory; and
one or more processors communicatively coupled the memory;
a run-time environment executable by the one or more processors; and
wherein the memory stores instructions which, when executed by the one or more processors, cause the one or more processors to:
analyze a first process of at least one of an enterprise system and a supply chain system, wherein the process is configured to utilize first sensitive data of a user;
generate one or more data-in-motion rules configured to at least partially anonymize the first sensitive data of the user;
evaluate compliance of the first process with one or more privacy regulations based, at least in part, on a model of the first process, wherein the model is generated based on information obtained via the analyzing;
determine one or more modifications to the first process based on the evaluating;
generate executable code for the process, wherein the one or more modifications comprises applying at least one data-in-motion rule of the one or more data-in-motion rules to the first process;
generate updated executable code for the first process based on at least one modification of the one or more modifications;
deploy the updated executable code to a run-time environment wherein the executable code is executed by the one or more processors to implement the process within the runtime environment; and
wherein the run-time environment is configured to:
monitor a second process;
detect second sensitive data provided to the process from a user device based on the monitoring;
generate a canonical knowledge graph representative of the second sensitive data provided to the process from the user device based on the monitoring;
generate an attack surface knowledge graph representative of attack pathways and vectors associated with the second process based, at least in part, on the monitoring, wherein the attack pathways and vectors correspond to vulnerabilities through which a malicious actor may obtain access to the second sensitive data;
perform penetration testing configured to evaluate threats targeting the second sensitive data based, at least in part, on the attack surface knowledge graph; and
output a recommendation for mitigating threats targeting the second sensitive data, wherein the threats are identified based on the penetration testing.

17. The system of claim 16, wherein the run-time environment is configured to:
receive a withdrawal of consent from the user; provide information identifying an impact of the withdrawal of consent to the user device; and trigger deletion of at least one of the first sensitive data and the second sensitive data corresponding to the withdrawal of consent from an external system associated with at least one of the first process and the second process.

* * * * *